Mar. 6, 1923.
H. A. SCHRAMM ET AL.
FUEL SAVER.
FILED FEB. 11, 1922.
1,447,901.
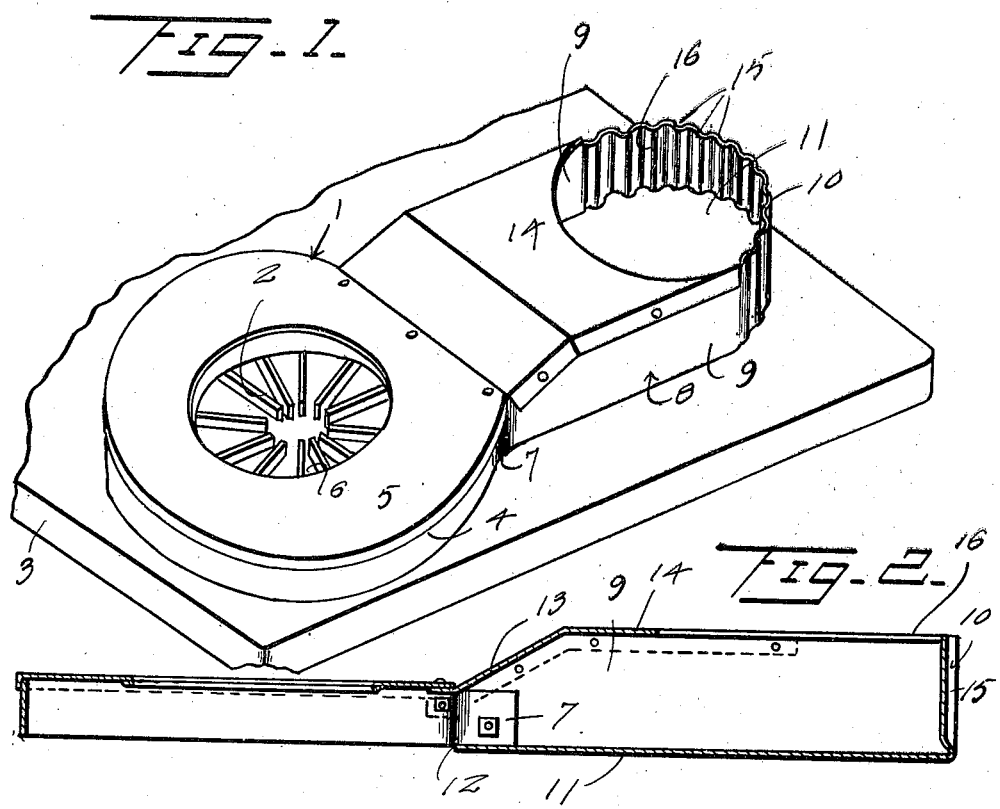
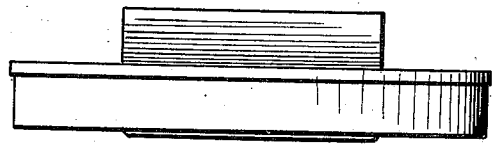
Inventor
H.A.Schramm
J.D.Hawkins.
By
Attorney Patented Mar. 6, 1923.

1,447,901

UNITED STATES PATENT OFFICE.

HENRY A. SCHRAMM AND JACKSON D. HAWKINS, OF SAN ANTONIO, TEXAS.

FUEL SAVER.

Application filed February 11, 1922. Serial No. 535,809.

*To all whom it may concern:*

Be it known that we, HENRY A. SCHRAMM and JACKSON D. HAWKINS, citizens of the United States, residing at San Antonio, in the county of Bexar and State of Texas, have invented certain new and useful Improvements in Fuel Savers; and we do hereby declare the following to be a full, clear, and exact description of the invention, such as will enable others skilled in the art to which it appertains to make and use the same.

This invention relates to new and useful improvements in fuel savers and has for its primary object the provision of means whereby two utensils containing ingredients to be heated or cooked may be heated from a single burner or fire source and said means also permits the cooking of cereals and the like without the flame from the burner coming in direct contact with the utensil containing the same and thereby obviate the scorching or burning of the cereal.

Another object of this invention is the provision of a fuel saver of the above stated character which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of our invention reference is to be had to the following description and accompanying drawings in which:—

Figure 1 is a perspective view illustrating a fuel saver applied to a stove,

Figure 2 is a longitudinal sectional view illustrating the same, and

Figure 3 is a view in end elevation of a fuel saver.

Referring in detail to the drawings, the numeral 1 indicates a burner element of circular formation adapted to be positioned over a burner 2 of a stove 3 and consists of a side wall 4 of substantially circular shape and a top wall 5 provided with a centrally arranged opening 6 that is disposed directly over the burner so that a cooking utensil supported by the top wall 5 may come in direct contact with the flame from the burner. The side wall 4 at one point is cut away and provided with parallel extending extensions 7 to which a heat flue 8 is secured. The heat flue 8 has one end of its side walls 9 secured to the extensions 7 while the other ends are formed integrally with a curved end wall 10 and which is formed integrally with a bottom wall 11 that is formed integrally with the lower edges of the side walls 9 and its end adjacent to the burner element 1 is cut away as shown at 12. The side walls 9 at their upper edges are cut away adjacent to the burner element 1 to form inclined rests 13 and have secured thereto a top wall 14 which has one end secured to the top wall 5 of the burner member and its other end arcuately cut away to cooperate with the curved end wall 10 and forming a circular opening to the heat flue and over which is adapted to rest a cooking utensil. The curved end wall is provided with a plurality of vertically disposed grooves 15 which are formed by corrugating the end walls 10 and said grooves are adapted to project beyond the wall of a cooking utensil resting upon the heat flue for the purpose of permitting the heat within the flue to escape therefrom and about the utensil.

The inclined rest 13 of the side walls 9 permits the top wall 14 to converge into a plane with the top wall 5 of the burner member while the remaining portion of the top wall is disposed in a plane above the burner member. The flue opening 16 defined by the top wall 14 and the curved end wall 10 is disposed laterally of the burner member 1 so that a cooking utensil may be placed thereon without interfering with the cooking utensil placed over the opening in the top wall 5 of the burner member.

From the foregoing description taken in connection with the accompanying drawings it should be apparent that a device has been provided whereby it is possible to heat two utensils separately from a single burner or fire source and that the ingredients in one utensil may be thoroughly cooked or heated without the liability of being scorched or burned caused by coming in direct contact with the flame of the burner, and also the two utensils being heated from a single burner materially reduces the expense as the heat for heating one utensil is converted or directed against a second utensil. When desiring to cook cereals or the like without the danger of burning or scorching the same and when not employing a utensil over the opening of the top wall of the burner member 1, the utensil containing the cereal is placed over the opening 16 in the heat flue and the opening in the top wall of the burner member 1 may be closed by a suitable lid (not shown).

While we have shown and described the preferred embodiment of our invention, it will be understood that minor changes in construction, combination and arrangement of parts may be made without departing from the spirit and scope of the invention as claimed.

Having thus described our invention what we claim is:—

A fuel saver comprising a burner member having a top wall with an opening therein, side walls below said top wall and extended to form the side and end walls of a heat flue, said flue having top and bottom walls, the top wall of said heat flue stopping short of the end wall thereof to provide an opening over which a utensil may be positioned, the end wall of said heat flue being curved and having vertically disposed grooves, the bottom wall of said flue extending to the lower edge of the end wall thereof, and said grooves adapted to be disposed beyond the bottom of a utensil to provide draft inducing openings.

In testimony whereof we affix our signatures in presence of two witnesses.

HENRY A. SCHRAMM.
JACKSON D. HAWKINS.

Witnesses:
Gus Lewis,
Thomas P. Price.